United States Patent [19]
Young

[11] 3,782,500
[45] Jan. 1, 1974

[54] LUBRICATION MEANS
[75] Inventor: Philip Young, Westfield, Mass.
[73] Assignee: United Aircraft Corporation, East Hartford, Conn.
[22] Filed: June 16, 1972
[21] Appl. No.: 263,492

[52] U.S. Cl.................................. 184/64, 308/132
[51] Int. Cl............................................... F16n 7/12
[58] Field of Search.............. 308/87 A, 87 R, 88 R, 308/126, 132; 184/64

[56] References Cited
UNITED STATES PATENTS
| | | | |
|---|---|---|---|
| 1,053,740 | 2/1913 | McReynolds | 308/87 A |
| 2,138,971 | 12/1938 | Keeler et al | 308/87 R |
| 1,510,377 | 9/1924 | Blose | 308/87 A |
| 143,763 | 10/1873 | Howe | 308/88 R |

*Primary Examiner*—Manuel A. Antonakas
*Attorney*—Norman Friedland

[57] ABSTRACT

An elongated generally T-shaped member forming a gutter is disposed on the bottom inner wall of a sleeve like element horizontally disposed adjacent a bearing of a rotating machinery so that lubricant admitted into the sleeve migrates to the T-shaped member judiciously tapered for increasing the hydrostatic head of the lubricant for directing it into the bearing instead of being returned to the reservoir as was the case heretofore.

3 Claims, 5 Drawing Figures

LUBRICATION MEANS

BACKGROUND OF THE INVENTION

This invention relates to lubricating systems and more particularly to means for assuring lubricant admitted into a sleeve disposed adjacent to bearings migrates to the bearings.

This particular invention is efficacious when used for rotating machinery where the bearing supporting the shaft is not directly lubricated but where the lubricant is admitted into an adjacent or sleeve-like member.

As for example, the air cycle machine utilized in aircraft air-conditioning system at high rotative speeds evidence low ball bearing life and premature failure as a result of an insufficient lubrication condition. In this particular embodiment, lubricant would be slung from the shaft which shaft extended through a sleeve or spring-seat disposed adjacent the bearing forming a good sized puddle in the planes of both wicks extending into the inner diameter of the spring-seat. Due to the high rotative speed, these puddles were entrapped by windage from the shaft rams until a sufficient buildup caused it to run to the bottom of the spring-seat and out of the wick holes without ever getting into the bearings.

I have found that I can obviate the problems noted above by incorporating into the sleeve-like element a ramp and gutter design without altering the basic functions of the existing wick lubrication system and thus providing means for delivering the lubricant to the bearings and substantially improving the bearing life. Thus, with the incorporation of the invention, when a sufficiently large puddle forms in the inner diameter of the sleeve (spring-seat) the lubricant runs to the bottom where it is entrapped in the spring-seat gutter. This gutter protects it from the shaft windage effects while at the same time providing a hydrostatic head for directing the lubricants directly toward the bearings rather than back into the wick holes.

SUMMARY OF THE INVENTION

The primary object of this invention is to provide an improved lubrication system for rotating machinery.

The further object of this invention is to provide for a lubrication system as described, means for directing the lubricant admitted to the inner diameter of a sleeve to an adjacent bearing.

A further object is to provide for a lubrication system where the lubricant is directed into a sleeve adjacent a bearing, a gutter disposed on the bottom inner wall of the sleeve and so tapered as to direct lubricant to the bearing when sufficient lubricant collects in the gutter.

Other features and advantages will be apparent from the specification and claims and from the accompanying drawing which illustrates an embodiment of the invention.

DESCRIPTION OF THE PREFERRED EMBODIMENT

Figure 1:
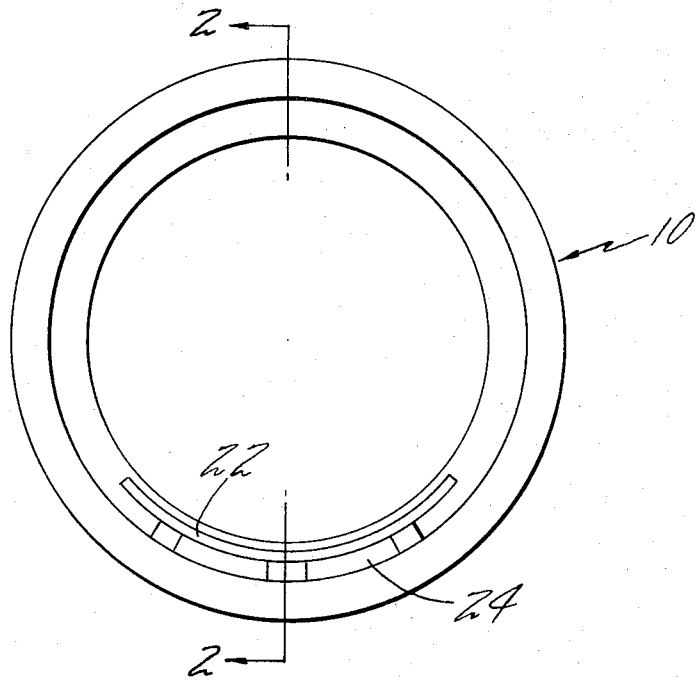
FIG. 1 is a view in elevation showing a sleeve incorporating this invention.
Figure 2:
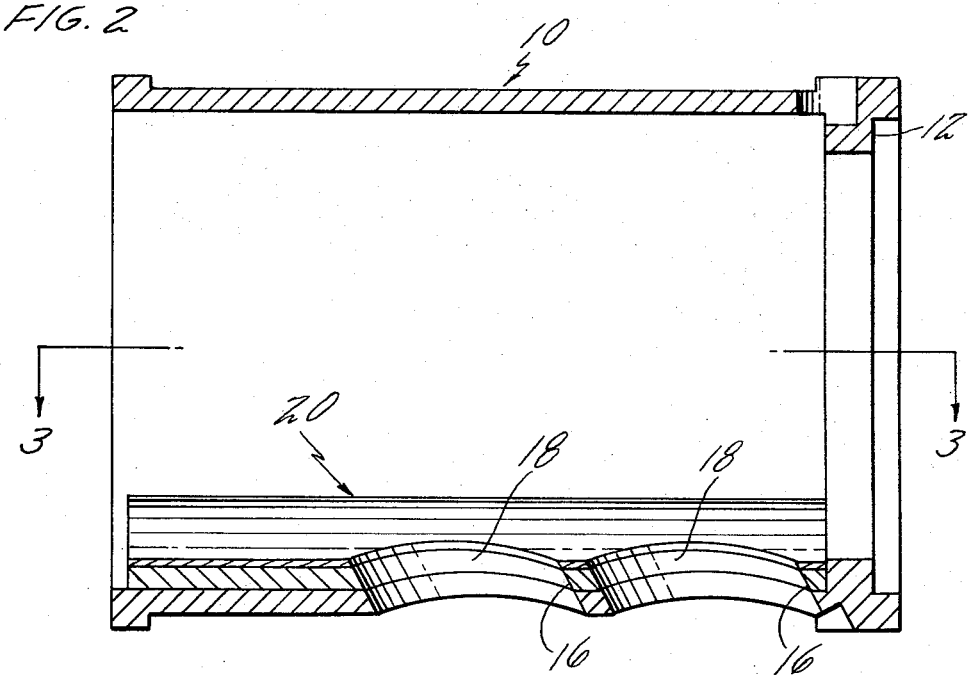
FIG. 2 is a sectional view taken along the line 2—2 of FIG. 1.
Figure 3:
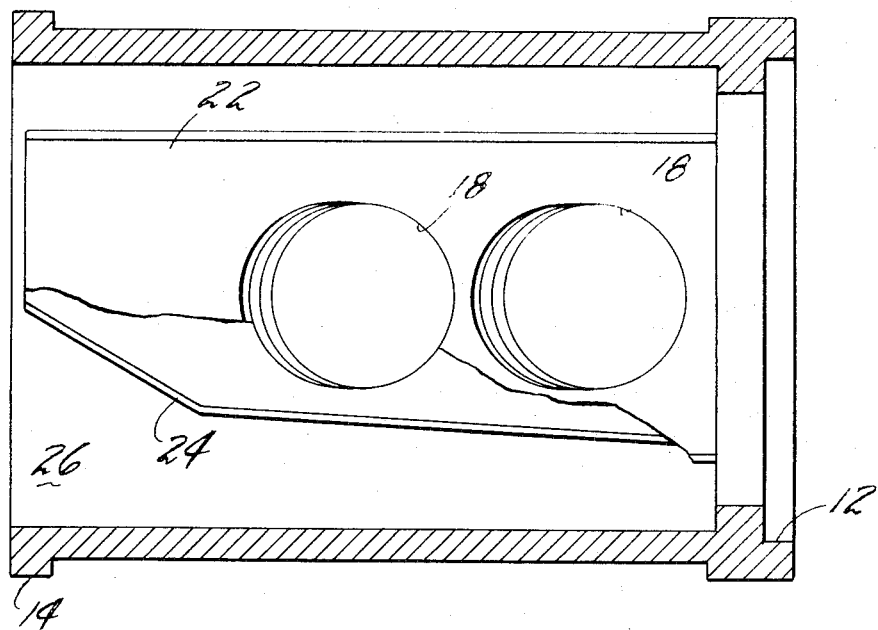
FIG. 3 is a sectional view, with a portion of the top flat plate of the gutter partially broken away, taken along the lines 3—3 of FIG. 2.
Figure 4:
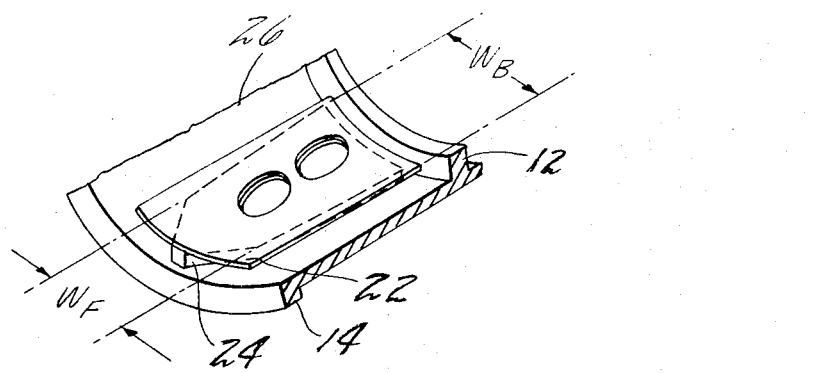
FIG. 4 is a scaled down perspective view showing the gutter mounted to the inner diameter of the sleeve-like element.

While this invention has been utilized in a spring-seat component for air cycle machine for aircraft which seat supports a spring for preloading the adjacent bearing supporting the rotating shaft, it is to be understood that this invention is not particularly limited thereto but may have other uses for rotating machinery as will be obvious to one ordinarily skilled in this art.

The spring-seat or sleeve generally illustrated by numeral 10 is a generally cylindrically shaped member having a shoulder 12 formed on one end to retain a spring (not shown) and outwardly extending flange 14 formed on the other end to bear against the bearing (not shown) such that the entire unit when mounted in a rotating machine surrounds the shaft and serves to preload the bearing. The pair of apertures 16 formed on the bottom of the sleeve and complementing the aperture 18 formed in the gutter element generally illustrated by numeral 20 serves to receive wicks which in turn are in communication with the oil reservoir and shaft for introducing lubricant into the sleeve 10.

In accordance with this invention the gutter element 20 comprises two component parts, a curvilinear plate like element 22 and tapered spacer or ramp element 24, also curvilinearly shaped to complement the shape of the inner wall 26 of the sleeve 10. The width identified as reference character $W_B$ at the back of spacer 24 is larger than the width identified by reference character $W_f$ measured in proximity to the front end. It being noted that the front and back refer to the closeness relative to the bearing mounted adjacent to the sleeve where the front is the closest point toward the bearing.

The curvilinear top plate being suitably bonded to the spacer 24 and extends sufficiently beyond the spacer at both sides so that lubricant running along the inner wall of the sleeve 10 is collected along the side edges of spacer 24 and the overhang prevents the windage created by the rotating shaft in the sleeve from adversely effecting its passage toward the bearing. The taper of the spacer member 24 from back to forward defines a ramp which serves to introduce a hydrostatic head to the lubricant for forcing it in a direction leading from the back to the front of the spacer and into the bearings.

The invention incorporated into an existing sleeve or spring-seat assembly exhibited a greater ability to increase the quantity of oil being delivered to the bearing than was heretofore evidenced. In the design incorporated into actual use the metallic spacer measuring approximately 0.060 inch thick was tapered and bonded to the inner diameter of the sleeve. The liner 22 measured approximately 0.016 inches thick extending beyond the spacer was bonded thereto to form the gutter which trapped the oil and protected it from internal wind forces.

Figure 5:
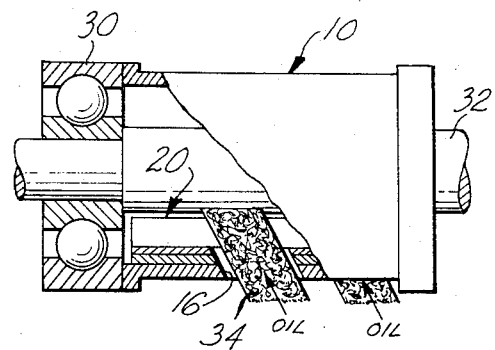
FIG. 5 is a view partly in elevation and partly in section illustrating this embodiment feeding lubricant to the adjacent bearing.

FIG. 5 illustrates the gutter assembly feeding lubricant to ball bearing 30 mounted adjacent the spring-seat or sleeve 10 for supporting shaft 32 for rotary movement. Wick 34 having one end extending into an oil reservoir (not shown) bears against the shaft 32. This serves to lead lubricant into the inner diameter of the sleeve where it is slung by the centrifugal field created by the rotating shaft and drops into the gutter and directed into bearing 30.

It should be understood that the invention is not limited to the particular embodiments shown and described herein, but that various changes and modifications may be made without departing from the spirit or scope of this novel concept as defined by the following claims.

I claim:

1. Means for delivering lubricant to a bearing of a rotating machine where a sleeve-like element is disposed in juxtaposition to the bearing and includes a lubricant passage leading lubricant into the sleeve-like element comprising a spacer extending upwardly from the bottom of the sleeve relative to the horizontal plane, said spacer being tapered from rear to front of said sleeve as viewed relative to said bearing, and a plate-like element secured to said spacer extending beyond the side edges of said spacer overlying said spacer whereby any windage created in the sleeve area will not effect the lubricant towards its passage to the bearing.

2. Means as claimed in claim 1 wherein said spacer includes a surface shaped to compliment the surface of the inner diameter of the sleeve and spanning segment of the sleeve and means for bonding said spacer to said sleeve.

3. Means as claimed in claim 1 including a wick extending through radial openings in said sleeve, said spacer and said plate-like element.

* * * * *